J. B. ROGERS & H. L. COLLETT.
TIRE PUMP.
APPLICATION FILED SEPT. 25, 1913.
1,119,990.
Patented Dec. 8, 1914.
2 SHEETS—SHEET 2.
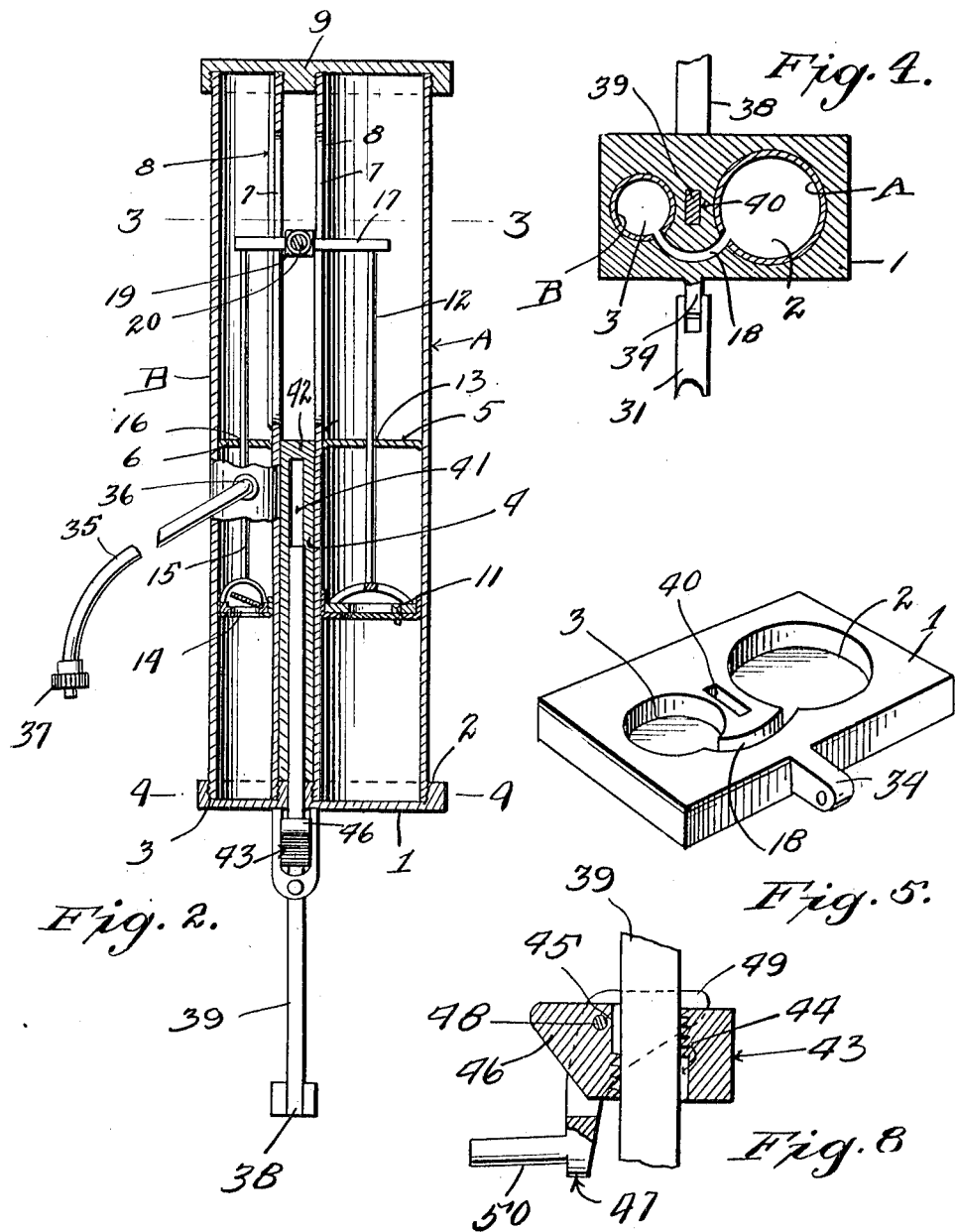
Witnesses
Inventors
J. B. Rogers
H. L. Collett.
By
Attorneys

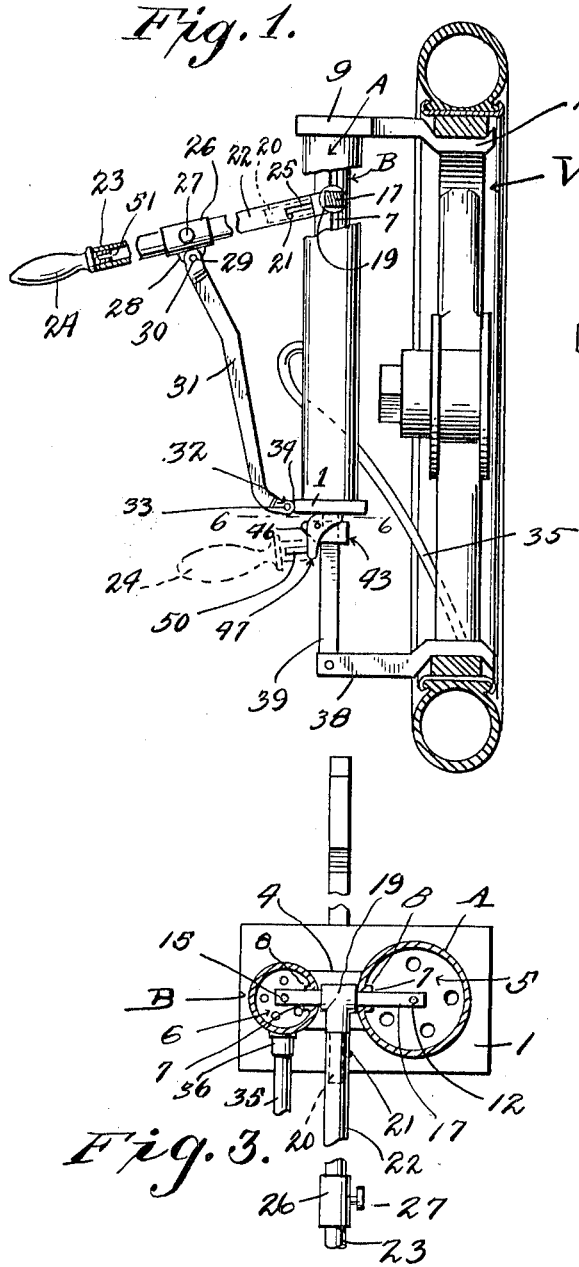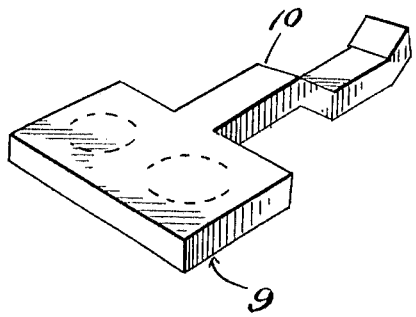

UNITED STATES PATENT OFFICE.

JAMES B. ROGERS AND HUBERT L. COLLETT, OF KIRKSVILLE, MISSOURI.

TIRE-PUMP.

1,119,990.   Specification of Letters Patent.   Patented Dec. 8, 1914.

Application filed September 25, 1913. Serial No. 791,843.

*To all whom it may concern:*

Be it known that we, JAMES B. ROGERS and HUBERT L. COLLETT, citizens of the United States, residing at Kirksville, in the county of Adair, State of Missouri, have invented certain new and useful Improvements in Tire-Pumps; and we do hereby declare the following to be a full, clear, and exact description of the invention. such as will enable others skilled in the art to which it appertains to make and use the same.

This invention relates to certain novel and useful improvements in tire pumps. and has particular application to a pump which is adapted to be clamped bodily to the wheel while being operated.

In carrying out our invention it is our purpose to provide a pump for inflating pneumatic tires, this pump being designed to be quickly and firmly clamped to the wheel at opposite points of the felly thereof, so that the pump will be firmly and rigidly supported and may therefore be easily operated with a minimum effort.

A further object of our invention is the provision of a tire pump which will embody in its construction the desired features of simplicity, efficiency and convenience, and which may be manufactured and marketed at a relatively low cost.

In the present instance, we have shown our pump as being in the nature of a double acting pump in which two parallel cylinders of different sizes are employed, the pistons of the cylinders being connected together with their effective strokes taking place in opposite directions.

With the above recited objects and others of a similar nature in view, our invention consists in the construction, combination and arrangement of parts set forth in and falling within the scope of the appended claims.

In the accompanying drawings: Figure 1 is a view in side elevation of a portion of a wheel and showing our pump applied thereto. Fig. 2 is a vertical longitudinal sectional view taken through the pump. Fig. 3 is a cross sectional view taken on the line 3—3 of Fig. 2. Fig. 4 is a similar view taken on the line 4—4 of Fig. 2. Fig. 5 is a perspective view of the base block of the pump. Fig. 6 is a cross sectional view taken on the line 6—6 of Fig. 1. Fig. 7 is a perspective view of the head block. Fig. 8 is a view partly in section and partly in elevation.

Referring now to the accompanying drawings in detail, the letter A designates the large cylinder of the pump, while B is the small cylinder arranged in parallelism therewith.

The numeral 1 indicates a base block for the cylinder having a recess 2 in which the lower end of the large cylinder seats, and a recess 3 in which the lower end of the smaller cylinder seats. Arranged between the two cylinders is a casting or web 4 which extends from the base block to a point about midway the cylinders. The cylinder A is provided substantially midway its length with a transverse partition 5, while the cylinder B is provided with a similar partition 6. The confronting walls of the two cylinders are formed with longitudinal slots 7—7 which extend from the partition to the tops of the cylinders. The walls of these slots 7 are reinforced by strips 8, inasmuch as such slots form slideways for the cross head of the piston, as hereinafter described. The tops of the cylinders are surmounted by a head block 9 which carries a hook arm 10 which is adapted when the pump is in place on the wheel to engage beneath the top portion or elevated section of the felly of the wheel W.

The numeral 11 indicates the valved piston head sliding in the cylinder A between the base block and the partition 5, while 12 is the rod of the piston head 11, which rod slides through the central opening 13 in the partition 5. A similar, but of course, smaller valved piston head 14 works in the cylinder B between the base block 1 and the partition 6, the rod 15 of the piston head 14 sliding through the central opening 16 in the partition 6. The upper ends of the piston rods 12 and 15 are connected by the cross head 17 which slides in the upper slotted sections of the cylinders. It will thus be seen that the two pistons are connected together to work in unison, but the effective stroke of the piston head 11 takes place in an opposite direction to the effective stroke of the piston head 14 in the manner of an ordinary double-acting air pump. Communication between the two cylinders is made by means of the channel 18 cut in the base block 1, the ends of the channel opening into the adjacent lower end portions of the cylinder. The cross head 17 carries at its central portion a collar 19 loose thereon, but held against endwise movement, this collar having extending therefrom a stud 20 formed with a lateral lug 21.

The numeral 22 indicates a shank member which is preferably in the nature of a tube portion or pipe, and is adapted to have the outer end 23 thereof detachably receive the handle 24. The inner end of this shank is formed with a bayonet slot 25, so that when such inner end of the shank is slipped over the stud 20 of the cross head collar 19, the shank may be turned so that such slot locks the lug 21, and consequently firmly secures the shank to the stud. This shank 22 is adjustably mounted in a sleeve 26 by means of a set screw 27. This sleeve 26 in turn is formed with a depending lug 28 which is pivoted at 29 in the bifurcated end 30 of the operating lever 31. The lower end of this lever is bifurcated at 32 and is connected by means of a rivet 33 with the lug 34 projecting from the base plate 1 at approximately the center of one side thereof. A flexible hose or tube 35 has one end connected with the pump at 36, while its free end is formed with the usual attachment 37 for connecting the tube with the tire valve.

In order to enable the pump to be securely and rigidly clamped to wheels of different sizes, we resort to the following operation: As above stated, the hook arm 10 carried by the head block 9 is adapted to fit beneath the top section of the wheel felly. A companion hook arm 38 is employed, which is designed to fit over and bear against the bottom section of the felly of the wheel, the direction of the hook portion of the arm 38, of course, being reverse with relation to the hook portion of the arm 10. This hook arm 38 is connected at one end with the lower end of the sliding bar 39. This bar is preferably rectangular in cross section and slides through a rectangular slot 40 extending through the base block 1, this slot 40 alining with the vertical longitudinal slot 41 extending through the web or casting 4, the upper end of this slot 41 terminating at 42 a short distance below the top of the web. It will thus be seen that the rod 39, carrying the hook arm 38 is adapted to slide in the slot and through the bore 40 in the block 1 so that the hook arms 10 and 38 may be adjusted or moved toward and from each other according to the diameter of the wheel to which the pump is to be clamped. Slidably mounted upon the bar 39 below the base block 1 is a block 43, the bore 44 of which is also substantially rectangular in form and while in its cross dimensions this bore is just of sufficient width to fit snugly on the bar 39, in its longitudinal dimensions, the bore is relatively greater than the width of the bar 39 so that it may tilt or rock slightly thereon. This sliding block 43 is provided with oppositely disposed dogs 45 which are adapted to grip opposite sides of the sliding bar 39 when the block 43 is canted or tilted so that such block will be wedged or held upon the bar 39. The sliding block 43 is formed with an extended end 46 which is spanned or straddled by the bifurcated cam 47, the latter being pivoted, to the block 43 by means of the bolt 48 passing through the cam arms 49. This bifurcated cam 47 is further provided with a short stem 50 which is designed to fit into the socket 51 of the handle 24. As has been above-mentioned, this handle 24 is removable from the tubular shank 22, and it may be applied to the locking cam 47 to operate the latter. In applying the pump to the wheel, the hook 10 is placed beneath the topmost section of the felly, while the arm 39 is adjusted until the hook 38 bears against the lowermost portion of the felly. The locking cam 47 at this time is, of course, in its unlocked position and the block 43 will be assumed to be positioned on the bar 39 at a point some distance below the base plate 1 of the pump. The handle being connected with the stud 50 of the locking cam, the latter is moved toward the base plate 1 until it abuts against the bottom of such plate. Pressure is then brought to bear downwardly upon the handle to swing the locking cam on its pivot and thereby bring the toe portion of the cam in locking position against the bottom of the base plate 1, this action of locking the cam causing the sliding block 43 to cant or tilt on the bar 39 so that the dogs 45 will bite or edge against the opposite sides of such bar 39 and consequently hold the sliding block 43 against movement. It will thus be seen that it will be impossible for the bar 39 to slide upward and thus shorten the length between the felly engaging hook arms which would cause the pump to be dislodged or loosened from the wheel, as such upper movement of the bar 39 is prevented by the locking cam bearing against the bottom of the base plate 1, and wedging the canted or tilted sliding block 43 on the bar 39. After the pump has been clamped on the wheel in the manner described, the handle 24 is inserted in the end 23 of the shank 22, the flexible hose or tube 35 is connected with the inflation stem of the tire and the device is operated in the manner of an ordinary hand operated pump, that is by rocking the handle up and down. By clamping the pump to the wheel in the manner described, it is unnecessary for the operator to employ a foot strip or rest to attempt to hold the pump steady and stationary by bearing his weight upon such rest, consequently this pump requires but very little strength to operate it, and being clamped rigidly and firmly to the wheel may be actuated by children and other persons of relatively little physical strength.

What we claim is:

1. The combination with a pump, of a head block therefor, a clamping arm carried by the head block and adapted to engage with one portion of the wheel, a base block at the opposite end of the pump, a member sliding through the base block, a clamping arm carried by the sliding member and adapted to engage with a diametrically opposite portion of the wheel from that engaged by the first mentioned clamping arm, means for locking the sliding member against movement, an inflation tube for the pump, and means for operating the pump.

2. The combination with a pump, including a pair of cylinders, of a head block for said cylinders, and a clamping member carried by the head block and adapted to engage one portion of the wheel, a web located between the cylinders at the lower portion of such cylinders, said web having a slide way formed therein, a base block at the lower ends of the cylinders having a bore therethrough communicating with the slide way of the web, a bar sliding through said bore and slide way in the web, a clamping member carried by said bar and adapted to engage with the diametrically opposite portion of the wheel from that portion engaged by the clamping member of the head block, means for locking the sliding bar against movement, an inflation tube for the pump, and means for operating the pump.

In testimony whereof, we affix our signatures, in the presence of two witnesses.

JAMES B. ROGERS.
HUBERT L. COLLETT.

Witnesses:
C. A. HAMILTON,
EDGAR MYERS.

Copies of this patent may be obtained for five cents each, by addressing the "Commissioner of Patents, Washington, D. C."